United States Patent [19]

Dyadechko et al.

[11] Patent Number: 4,822,490

[45] Date of Patent: Apr. 18, 1989

[54] BACTERIAL COMPOSITON AND METHOD FOR RECOVERY OF OIL-POLLUTED WATER AND SOIL

[75] Inventors: Vladimir N. Dyadechko; Ivan I. Nesterov; Lidia E. Tolstokorova; Svetlana V. Platonova, all of Tjumen, U.S.S.R.

[73] Assignee: Zapakno-Sibirsky Nauchno-Issledovatelsky Geologorazvedochny neftyanoi institut (Zapsibnigni), Tjumen, U.S.S.R.

[21] Appl. No.: 174,797

[22] PCT Filed: May 29, 1986

[86] PCT No.: PCT/SU86/00053

§ 371 Date: Jan. 15, 1988

§ 102(e) Date: Jan. 15, 1988

[87] PCT Pub. No.: WO87/07316

PCT Pub. Date: Dec. 3, 1987

[51] Int. Cl.$^4$ .......................... C02F 3/34; E02B 15/04
[52] U.S. Cl. ..................... 210/611; 210/922; 435/877; 435/253.3; 134/40
[58] Field of Search ............... 210/610, 611, 908, 922; 435/253, 877; 134/40

[56] References Cited

U.S. PATENT DOCUMENTS

| 3,871,957 | 3/1975 | Mohan et al. | 210/611 X |
| 3,959,127 | 5/1976 | Bartha et al. | 210/611 |
| 4,288,545 | 9/1981 | Spraker | 435/253 X |
| 4,452,894 | 6/1984 | Olsen et al. | 435/253 |
| 4,521,515 | 6/1985 | Hata | 210/611 X |
| 4,535,061 | 8/1985 | Chakraborty et al. | 435/253 |
| 4,593,003 | 6/1986 | Vandenbergh | 435/253 |
| 4,732,680 | 3/1988 | Weaver et al. | 210/610 |

FOREIGN PATENT DOCUMENTS 925875 5/1982 U.S.S.R.
1076446 2/1984 U.S.S.R.

Primary Examiner—Tom Wyse
Attorney, Agent, or Firm—Burgess, Ryan and Wayne

[57] ABSTRACT

The composition intended for recovery of oil-polluted water and soil contains *Pseudomonas putida*-36 as an active biocomponent deposited under No. B- 2443 and a salt mixture as a mineral component, mass %: 34.26–37.12 of $KNO_3$; 28.66–31.28 of $NH_4Cl$; 25.42–28.71 of $NH_4H_2PO_4$; and 2.89–11.66 of $NH_4NO_3$. The mass ratio between the biocomponent and mineral component is 1:26–32. The composition can be utilized with or without the carrier in the form of a solid inert substance or water.

13 Claims, No Drawings

BACTERIAL COMPOSITON AND METHOD FOR RECOVERY OF OIL-POLLUTED WATER AND SOIL

FIELD OF THE ART

The present invention relates to environmental protection, refers to biological recovery of oil-polluted water and soil and, more particularly, to a bacterial composition intended for this specific purpose.

PRIOR ART

The wide-spread pollution of water and soil with oil components observed at present is attributed to the ever-growing volumes of output, transportation, refining and utilization of oil and oil products. Such traditional methods of recovery as mechanical, chemical and physical fail to provide a sufficient degree of recovery of oil-polluted water and soil. Therefore, it has been suggested to achieve this aim by resorting to the recources of Nature itself, i.e. the effect of microorganisms capable of assimilating the hydrocarbons of oil. It has been established by research that in the oil spilled over the sea surface in the form of a film 0.1–0.4 m thick the nonvolatalized components of oil are attacked by various microbes which degrade a considerable proportion of oil within 2-3 months. Besides, it is emphasized by scientific research that the amount of oil decomposed by other organisms or by natural oxidation amounts to one tenth the amount degraded by microbes.

However, in case of heavy pollutions, the process of natural self-recovery of water basins may stretch over a long time, reaching several scores of years. It has been calculated that the rate of biodegradation is 0.5 kg/ha/-day so that degradation of 64 000 t of oil spilled after a tanker wreck may take as long as 20 years approximately. Microbial hydrocarbon degradation within intertidal zones impacted by the Amoco Cadiz oil spillage. Atlas R.M., Bronner A. "Amoco Cadiz. Consequences pollut. accident. hydrocarbons. Actes Colloq. Int., Brest, 19.22 November 1977 Paris, 1981, pp. 251–256).

Known in the prior art are methods for removal of oil from the water surface by the use of microorganisms and stimulating their activity by introducing the sources of nitrogen and phosphorous into the polluted medium (FRG Application No. 2417431; U.S. Pat. Nos. 4,042,495, 4,087,356). However, the population density of microorganisms of natural biocenoses is so low that even intensive mineral feeding failed to bring about the satisfactory degree and time of oil degradation on water.

A more promising proposition in this field was constituted by application to the polluted area of bacteria cells of the hydrocarbon-oxidizing microorganisms either in the form of pure isolated cultures or a combination of several genera and species of said microorganisms (Microbiological J. 47, No. 2, publ. 1985, E. I. Kvasnikov, T. M. Klushnikova, S. L. Kuberskaya, V. S. Zalevsky, G. F. Smirnova, T. P. Kasatkina, V. I. Svarnik, A. A. Koval "The use of bacteria associations for recovery of oil-polluted bilge water", pp. 12–14).

The difficulties of controlling the quantitative and qualitative composition of bacterial associations denied the possibility of launching the industrial employment of this method.

The widest recognition was given to the use of microorganisms mutants produced by the gene engineering methods.

Such "supermicrobes" exhibiting a high oil-oxidizing activity are capable of degrading small amounts of spilled oil in a short time but fail in cases of massive pollutions which call for longer periods of oil degradation. Thus, it is known, that the life span of the mutant, genus Pseudomonas, is but 7.5 days from the start of multiplication to death, which limits its employment only to a crude oil content in water not exceeding 500 mg/l (European Pat. No. 00077422, IPC C 12 N 1/20, Sept. 26, 1984). In addition, it has been found that the mutants are unstable and apt to lose quickly the properties inoculated to them in natural conditions.

The pure cultures isolated from the natural environment prove to have more stable properties. For example, there is a known strain *Pseudomonas putida*-36, separated from an oil-polluted area of soil that has remained unrecovered for a long time; said strain is deposited under No. B-2443 in the Central Museum of Industrial Microorganisms of the Research Institute "Vniigenetika". This strain is utilized for the recovery of oil-polluted water and soil (USSR Inventor's Certificate No. 1076446, IPC C 12 N 15/00, Feb. 28, 1984).

The prolonged existence of the strain under extreme conditions has adapted it perfectly not only to a high degree of oil pollution but also to the presence of hightly-toxic chemicals in the habitat and to sharp variations of temperature. The high resistance of the strain and the stability of its oxidizing properties made it useful in recovery of natural fresh and sea-water basins, industrial sewages of oil refineries, oil storage and transport tanks and oil-polluted soils.

However, the degree of water and soil recovery from various kinds of oil remained insufficient, being 68.4% for aromatic and 74.5% for paraffin oils.

Thus, the problem of removal oil and oil products from the surface of water and soil remains pressingly urgent and calls for elaboration of new, more efficient methods and means.

OBJECTS OF THE INVENTION

An object of the present invention is to provide a bacterial composition for the recovery of oil-polluted water and soil which would provide for the highest degree of recovery while being cheap, readily available and simple in preparation and industrial utilization.

The above object has been achieved by developing a bacterial composition for the recovery of oil-polluted water and soil, the active biological component of said composition being the strain *Pseudomonas putida*-36 deposited under No. B-2443 which, according to the invention, is characterized in that its mineral component is a mixture of mineral salts in the following proportions, mass %:

$KNO_3$: 34.26–37.12
$NH_4Cl$: 28.66–31.28
$NH_4H_2PO_4$: 25.42–28.71
$NH_4NO_3$: 11.66–2.89

The claimed composition makes for a maximum elimination of polluting oil from water and soil.

A good practice is to use the strain *Pseudomonas putida*-36 containing from $1.8 \cdot 10^{10}$ to $3.6 \cdot 10^{12}$ living cells per 1 g of dry biomass.

The composition containing the above strain with $1.8 \cdot 10^{10}$ to $3.6 \cdot 10^{12}$ living cells per g of dry biomass proves to be most effective.

It is practicable that the mass ratio in said composition between the biocomponent and mineral component, i.e. the mixture of said salts would be 1:26-32.

The above ratio is sufficient for maintaining the active vitality of said strain.

The claimed composition may be used with or without a carrier, solid or liquid one. Water may be used as a liquid carrier while talc, diatomite, kaoline, paraffin, etc. as a solid one.

The content of said strain in the composition with liquid (water) carrier is $10^4$ to $10^6$ cells/ml and that of the mixture of said salts, 0.07-0.08 mass %. This amount of the bicomponent is most rational because the content of bicomponent cells below $10^4$ will prove insufficient for normal growth and development of cells while the content of the mixture of said salts below 0.07 mass % at the given content of bicomponent cells will be insufficient for the normal growth of the bicomponent; at the same time, the content of bicomponent cells exceeding $10^6$ is inexpedient since in presence of hydrocarbons in oil pollutions their contents increases due to natural multiplication.

An object of the invention also lies in providing a method of recovery of oil-polluted water and soil comprising the use of said composition without a carrier, applied at the rate of 350-800 mg/m$^2$ of the polluted area.

This amount of the composition is enough for an all-round recovery of water polluted by up to 25 kg/m$^3$ of oil and of soil containing up to 10 kg/m$^2$ of oil.

The polluting agents in said methods may be crude oil and its products such as mazouts, lubricants, oils, fuels.

The claimed invention improves the recovery of oil-polluted water and soil by 22-32% as compared with the use of the strain covered by USSR Inventor's Certificate No.107446 and permits converting the hydrocarbons to the ecologically neutral compounds, thus attaining a high environmental effect.

The claimed composition is innocuous to man and environment being active both in fresh and sea water and on land.

The composition features a high resistance to chemical pollution of water and soil with toxic elements of drilling muds and other chemical reagents.

These and other advantages of the invention will become apparent from the detailed description that follows.

The strain *Pseudomonas putida*-36 used in the composition is isolated from the waste drilling mud on organic basis (oil) in the Tyumen oil fields, USSR, and deposited under No.IIMIIM B-2443 in the Central Museum of Industrial microorganisms of the Research Institute "Vniigenetika".

The *Pseudomonas putida*-36 strain has the following characteristics.

Morphological and culture properties

Size of one-day culture is 1.7-2.4·0.3-0.5 μm. The prevailing shape of cells is straight, rodlike. Gram-negative. The colonies growing on plain agar are of the convex, round colourness nature, 3-7 mm in size. On beef-extract broth it forms cloudy gas-evolving sediment. Cultivation on potato agar results in intensive growth with prominent continuous streaks and formation of mucus. Does not liquefy gelatin. Curdles and acidifies milk.

Physiological properties

Aerobe, grows at 28°-42° C., ceases to grow at temperatures below 4° C.

Relation to carbohydrates: assimilates lactose, glucose and maltose with evolution of gas. Does not assimilate arabinose.

Relation to hydrocarbons: assimilates naphthalene, camphor, octane, hexane, benzene, toluene, xylene, paraffin, asphaltenes. Paraffin oils assimilated better than aromatic types.

Relation to nutrient sources; assimilates nitric nitrogen.

The strain requires no special nutrients, being capable of growing on hydrocarbon-depleted media, e.g. stratal water mineralized to not over 10 g/l, is viable at an ambient temperature from 70° C. down to minus 50° C. and its activity is not affected by varying weather conditions.

On being dried, the cells retain their viability and hydrocarbon-oxidizing ability which is superior to that of the source strain. Observation of the titer of a lyophilized culture over a 24-month storage period has confirmed its stability.

The claimed strain relates to nonpathogenic microorganisms. Peroral, inranasal, intraabdominal and intravenous administration to white mice, keratoconjunctival and epicutaneous application to rabbits have revealed its practical harmlessness and nonpathogenicity. The clinical observation of the medical staff handling said strain revealed no allergies nor bacterioses.

According to the invention the disclosed strain is used in combination with a mixture of mineral salts. Inasmuch as the strain *Pseudomonas putida*-36 is specifically noted for assimilation of nitrates, nitrate compounds have been given a special preference in selecting the mineral salts.

It has been found, that the optimum relation of the main sources of mineral feeds such as N, $P_2O_5$, $K_2O$ is 1:1:1. Such a relationship can be obtained with the following composition of mineral salts, mass %:

$KNO_3$: 34.26-37.12
$NH_4Cl$: 28.66-31.28
$NH_4H_2PO_4$: 25.42-28.71
$NH_4NO_3$: 11.66-2.89

Thus, the mineral component of the claimed composition delivers 17% N into the habitat of bacteria (10.2% in the form of $NH_4Cl$, $NH_4NO_3$, $NH_4H_2PO_4$ and 6.8% in the form of $KNO_3$ and $NH_4NO_3$); 17% $P_2O_5$ (including 15% of water-soluble $P_2O_5$) in the form of $NH_4H_2PO_4$ and 17% of $K_2O$ in the form of $KNO_3$.

Said balance of N, $P_2O_5$ and $K_2O$ ensures the most effective utilization of the strain *Pseudomonas putida*-36 for the recovery of water and soil polluted by oil and oil products.

The culture of microorganisms may be used both in the native and dry form.

To produce the biomass of the cells, the strain *Pseudomonas putida*-36 is grown in liquid or solid nutrient media containing the sources of nitrogen, phosphorus and potassium in presence of hydrocarbons. Cultivation is carried out in aerobic conditions at 30°. In these conditions the cells of microorganisms grow and develop vigorously. If need be, the obtained biomass of the cells can be dried by lyophilizing or dry-air spraying.

The obtained biomass should contain from $1.8 \cdot 10^{10}$ to $3.6 \cdot 10^{12}$ living cells per 1 g of dry mass.

The composition can be prepared, either dry or as an aqueous solution.

Preparation of the dry composition, whether with or without the carrier consists in simple mechanical mixing of the bicomponent, a mixture of mineral salts and, if necessary, a carrier.

The claimed composition containing a biological and a mineral components is a light free-flowing yellowish powder easily soluble in water, oil-polluted too.

Preparation of the composition in the form of an aqueous solution is confined to mixing the bicomponent and said combination of mineral salts in water.

The dry composition as a whole can be mixed with water; altelrnatively, each component, i.e. biocomponent and mineral component can be mixed with water separately.

The obtained aqueous composition is transparent and slightly opaque due to the presence of the biological component.

The recommended mass ratio of the biological component and mineral salt mixture is 1:26–32. In other words, there are 26–32 mass parts of the mineral component (mixture of salts) to one part of the biological component. This relationship is governed by the fact that the amount of mineral component below 26 mass parts will be insufficient for effective activity of bacteria while its amount exceeding 32 mass parts fails to provide additional stimulus to the vital activity of cells and brings about an unwarranted and undesirable expenditure of the mineral component.

The term "oil pollution" should be understood as the presence of crude oil or oil products in a water-dissolved, emulsified and film state in the natural and articifical water basins, in sea water and on areas of land.

The dry composition should be given preference for the recovery of local pollutions of vast areas or small stretches of damp soil.

The dry composition is readily dissolved in water so that the bacterial cells are quickly and uniformly distributed in the water-oil contact zone and are given access to the nutrient substrate (hydrocarbons) thus ensuring rapid growth of the cells and allround elimination of oil pollutions as proved by visual observations and control analyses.

It is expedient that the wide areas of both water and land shall be recovered from oil pollutions by means of a composition with a carrier, either liquid, e.g. water, or solid, e.g. talc, diatomite, paraffin, kaoline and other inert, light, solid materials. The employment of fillers makes for a more uniform distribution of a relatively small amount of the composition over large polluted areas from airplanes and helicopters. If a solid carrier is used, its ratio in the claimed composition is 30–50 to 1.

The preferable liquid carrier is any kind of water since it is generally available, neutral and innocuous towards the object of pollution, and because bacteria tend to grow more intensively in water which proves to be most essential when dealing with oil pollutions on dry lands, sandy and stony areas, such as beaches and sea-fronts.

Concentration of the bicomponent in an aqueous solution ranges from $10^4$ to $10^6$ cells/ml. If this concentration is under $10^4$, it will prove insufficient for the normal growth and development of cells while concentration above $10^6$ is unreasonable since the amount of bicomponent cells increases due to their natural multiplication in the presence of hydrocarbons in oil pollutions.

The above concentration of cells in the aqueous solution is obtained by dissolving 2.5–25 g of the biological component containing $1.8 \cdot 10^{10}$ to $3.6 \cdot 10^{12}$ living cells in one litre water.

Another object of the invention is a method of recovery of oil-polluted water and soil comprising the polluted areas. The composition in any form (whether dry or a water solution) is applied mostly once to the polluted area where the above-cited parameters, i.e. content of bicomponent cells and the amount of the mineral salt mixture make for an active growth of biocomponent cells and ensure their active vitality. Depending on the intensity of oil pollution, the amount of applied composition varies from 350 to 800 mg per sq. m. of the treated surface. This amount is sufficient for eliminating oil pollution of up to 25 kg/m$^3$ of water and up to 10 kg/m$^2$ of soil.

The disclosed invention is by far more profitable commercially than the methods known in the prior art.

The invention provides a radical solution of the environment protection problem, particularly the recovery of oil-polluted water and soil and, what for its technical and economical indices, it outclasses the known methods pursuing similar purposes.

An emphatic advantage of the disclosed composition and the method of its application is the increase in the degree of water and soil recovery to an absolute reliability after they have been massively polluted with oil and oil products.

The disclosed composition simplifies the process of recovery due to its ready-to-use form whereas the use of a pure culture involves additional complications caused by the necessity for growing the bacteria on liquid nutrient media, carrying them to the point of application, additional control of the concentration of living bacterial cells, etc.

The disclosed composition and the method of application thereof can be readily realized under industrial conditions since they do not require any special equipment and specially-trained personnel. The method is successfully applicable in the field.

The disclosed composition does not require any particular storage conditions and its application is not affected by weather and climate. The composition is noted for stability of its properties.

The disclosed composition is harmless for man and environment, it is explosion- and fire-proof.

The disclosed composition can be successfully used in a number of media, such as sea and fresh water, industrial sewages, areas of soil polluted with crude and bunker oil and the products of its refining, e.g. diesel fuel, mazout, lubricants, etc.

BEST MODE OF CARRYING OUT THE INVENTION

The best composition is the one containing the strain *Pseudomonas putida*-36 deposited under No.B-2443 and a mixture of mineral salts, mass%: $KNO_3$—36.53; $NH_4Cl$—30.83; $NH_4H_2PO_4$—27.53 and $NH_4NO_3$—5.11. The content of living cells in the biological component is about $3.6 \cdot 10^{12}$ per gram of dry biomass. The ratio of biological to mineral components is 1:28. The composition is prepared by mixing its components in the mass ratios specified above. The composition is a light finely-dispersed powder. It is practicable that said composition be used as an aqueous solution.

This composition is most effective in comparison with other formulas since it requires a lower expenditure of the biocomponent and, consequently, permits using the same amount for treating a much larger area of pollution. Thus, in case of a composition whose biocomponent contains $1.8 \cdot 10^{10}$ living cells per g of dry biomass, its consumption rate is 25 mg per m² while the bicomponent having $3.6 \cdot 10^{12}$ living cells per g of dry biomass can be used at the rate of a mere 2.5 mg per m² which reduces the consumption of the bicomponent 10 times, or, in other words, increases the treated area 10 times.

This version curtails considerably the expenditures for transportation of the composition.

The present invention will become more apparent from the appended examples of which examples 1 through 3 illustrate the preparation of biocomponent, examples 4 through 6 describe the preparation of the dry composition without a carrier, examples 7 through 9 describe its preparation in an aqueous solution, examples 10 to 12 explain the preparation of the dry composition with a carrier, examples 13 through 17 illustrate the use of the claimed composition for the recovery of oil-polluted water and soil, and example 18 shows the use of a pure strain, mixture of mineral salts and of the disclosed composition.

Example 1

This example illustrates the preparation of biomass from the cells of the active component of the composition. The source strain *Pseudomonas putida*-36 is grown on a liquid nutrient medium in the presence of hydrocarbons, e.g. crude oil by the deep cultivation method in a fermenter on the nutrient medium of the following formula, g.:

$K_2HPO_4$: 10.0
$KH_2PO_4$: 1.0
$NH_4NO_3$: 2.0
$H_2O$ : 1000.0

Cultivation is carried out under aerobic conditions at 30° C. the prepared biomass is concentrated and dried by the method of dry-air spraying at +60+C. The number of living cells found by the titration method has been $1.8 \cdot 10^{10}$ per g of dry matter.

Example 2

The biomass is prepared by the techniques laid down in Example 1. The obtained biomass is dried by the dry-air spraying method at 40° C. The produced bioproduct contains $2.4 \cdot 10^{11}$ living cells per g of dry matter.

Example 3

The biomass prepared as described in Example 1 is dried by the method of lyophilization. The obtained product contains $3.6 \cdot 10^{12}$ living cells per g of dry matter.

Example 4

1 g of the dry biomass prepared as described in Example 1 is mixed with 25 g of mineral salt mixture of the following composition, mass % : $KNO_3$—34.26, $NH_4Cl$—28.66; $NH_4H_2PO_4$—25.42. The prepared composition has the form of a finely dispersed yellowish powder.

Example 5

1 g of the dry biomass prepared as in Example 2 is mixed with 28 g of a mineral salt mixture of the following composition, mass %: $KNO_3$—36.53; $NH_4Cl$—30.83, $NH_4H_2PO_4$—27.53, $NH_4NO_3$—5.11. The produced composition has the form of a finely-dispersed yellowish powder.

Example 6

To increase the concentration of the composition, 1 g of the dry composition prepared as in Example 3, containing $3.6 \cdot 10^{12}$ living cells per g of dry matter is mixed with 32 g of a mineral salt mixture comprising 37.12% $KNO_3$, 31.28% $NH_4Cl$, 28.71% $NH_4H_2PO_4$ and 2.89% $NH_4NO_3$. The produced composition has the form of a finely-dispersed yellowish powder.

Example 7

To make a water solution, 362.5 mg of a dry composition prepared according to Example 4 should be mixed with 0.5 l water. The produced liquid composition contains $10^4$ living cells per ml and 0.07% of a mineral salt mixture. The prepared composition is transparent and slightly opaque due to the presence of the biological component.

Example 8

To prepare an aqueous solution, 540 mg of the dry composition produced according to Example 5 should be dissolved in 0.75 l water. The obtained liquid composition contains $10^5$ cells per ml and 0.07% of the mineral salt mixture. The composition is transparent and slightly opaque due to the presence of the biocomponent.

Example 9

To prepare an aqueous solution, 825 mg of the dry composition produced according to Example 6 should be dissolved in 1 l water. The obtained aqueous composition contains $10^6$ living bacterial cells per 1 ml and 0.08% of the mineral component.

Example 10

To prepare a granular composition, 26 g of the dry composition containing 1 g of biocomponent and 25 g of a mineral salt mixture should be mixed with 780 g of paraffin carrier. The mass ratio of the dry composition to the carrier is 1:30. The carrier should first be ground to granules 0.05–0.1 mm in size and placed into a plate granulator together with the dry composition. The obtained granular composition is recommended for the recovery of oil-polluted water surfaces.

Example 11

To prepare a dry composition, 29 g of the dry composition produced according to Example 5 and containing 1 g of biocomponent and 28 g of a mineral salt mixture should be mixed with 1160 g of kaoline carrier at a ratio of 40 parts of the filler to 1 mass part of the dry composition. The mixture then should be vigourously mixed by mechanical agitators. The obtained composition is a light free-flowing white powder.

Example 12

To prepare a dry composition, 33 g of the dry composition position produced according to Example 6 and containing 1 g of biocomponent and 32 g of a mineral salt mixture should be mixed with 1650 g of diatomite carrier. The ratio of dry composition and carrier is 1:50 mass parts. A thoroughly mixed composition with the carrier is a light-grey free-flowing light powder. The obtained composition is recommended for the recovery of large oil-polluted areas of bogged and water-logged soils.

Example 13

An area of soil 50 000 m² has been polluted by a dose of 10 kg of crude oil per m². In other words, the total amount of oil in the area was 500 tons. To eliminate the oil pollution, 50 m³ of the aqueous solution according to Example 9 was used. Each liter of the composition contains 825 g of a mixture of biocomponent with mineral salts. The composition is spread uniformly at the rate of 1 l/m² by spraying from self-propelled sprayers equipped with pressure pumps capable of delivering the pulverized jet of liquid to a distance of 35–45 m. On expiration of 2 months after a single treatment, the amount of destroyed oil was 460 t. The experiment was conducted in sunny weather alternating with rains, the temperature varying from +26° to 0° C. Observations revealed active plant vegetation in the polluted area.

Example 14

A section of a natural fresh-water basin within the territory of an oil field has been polluted with crude oil over an area of 25 000 m² at the rate of 23.3 l per m³ which means that the total amount of crude oil in the section was 581.5 t. To eliminate oil pollution a water composition produced according to Example 8 was used. Said composition contained 543.75 mg of dry composition in which 18.75 mg of biocomponent and 525 mg of a mineral salt mixture were present at a ratio of 1:28 and the water solution contained $10^5$ living bacterial cells per ml and 0.07% of the mineral salt mixture. The composition was prepared in the amount of 18.75 m³ at the rate of 0.75 l per m² of the polluted surface. The water composition was applied once by uniform aerial spraying. On expiration of 2 months after treatment the basin was completely recovered from oil.

Example 15

An object of treatment is open sedimentation basins for industrial sewage of an oil refinery. The total area of the basin is 800,000 m², the volume of water, 1.5 million m³. The content of oil products (water-soluble, emulsified and in a film state) amounts to 75 mg/l.

The oil pollution is eliminated by the use of a composition produced according to Example 7 and containing 2.5 kg of biocomponent and 70 kg of a mineral salt mixture dissolved in 400 m³ of water; this composition contains $10^4$ living bacterial cells and 0.07% of the mineral salt mixture per ml water.

The composition is distributed uniformly over the entire area of the waer basin at the rate of 0.5 l/m² from a fire truck equipped with a tank and a carriage-mounted fire hose.

14 days after a single treatment the content of oil products in water has dropped to 0.5 mg/l, remaining stable at this level within the following 14 days in spite of a constant inflow of the industrial sewage laden with 75 mg/l of oil products.

Example 16

A glass reservoir (1.25 m long, 0.8 m wide, 0.15 m high) is filled with 100 l of water from the Kara Sea and 1720 g of crude oil. The oil film is removed by using 22.5 g of the composition prepared in accordance with Example 10. This composition contains 25 mg of biological component, 700 mg of mineral component and 21.75 g of paraffin carrier. At a room temperature of 18° C. the sea water was completely purified of oil within 14 days after a single treatment.

Example 17

A 200 m² boggy area of soil polluted with 60 kg of oil (0.3 kg/m²) was treated with 7 500 g of the dry composition prepared according to Example 12. The dry composition was uniformly sprayed over the polluted area at the rate of 37.5 g per m². This dose contained 25 mg of the biocomponent, 750 mg of a mineral salt mixture and 36.75 g of the inert diatomite carrier. 22 days after a single treatment the area was fully cleaned from oil.

Example 18

The given example illustrates the employment of a pure strain *Pseudomonas putida*-36, or of a mineral salt mixture or of their combination, i.e. the claimed composition for elimination of oil pollutions. The results gained are summarized in the Table below.

TABLE

Results of Tests of Strain Pseudomonas Putida-36, Mixture of Mineral Salts and Claimed Composition for Recovery of Oil-Polluted Water and Soil

| Conditions of experiment | Treating material | Sample No. | Oil degradation efficiency, % aromatic oil | paraffin oil |
|---|---|---|---|---|
| 1 | 2 | 3 | 4 | 5 |
| Oil-polluted water. 1% vol. | Strain Pseudomonas putida-36 | 1 | 69.1 | 72.8 |
| | | 2 | 87.5 | 76.7 |
| | | 3 | 68.72 | 73.9 |
| Duration of experiment 96–120 h. | Mineral salt mixture %: KNO₃ 36.53 NH₄Cl 30.83 NH₄H₂PO₄ 27.53 NH₄NO₃ 5.11 | 1 | 6.7 | 7.1 |
| | | 2 | 6.9 | 5.8 |
| | | 3 | 5.6 | 6.7 |
| | | | 6.4ˣ | 6.53ˣ |
| | Claimed composition containing strain | 1 | 98.6 | 99.8 |
| | | 2 | 98.9 | 100.0 |
| | Pseudomonas putida-36 and mixture of said mineral salts | 3 | 99.7 | 100.0 |
| | | | 99.06ˣ | 99.93ˣ |
| Oil-polluted soil, 10% vol | Strain Pseudomonas putida-36 | 1 | 73.9 | 75.1 |
| | | 2 | 68.2 | 74.9 |
| | | 3 | 72.7 | 79.2 |
| | | | 71.6ˣ | 76.4ˣ |
| Duration of experiment 20–30 days | Mineral salt mixture, % KNO₃ 36.53 NH₄Cl 30.83 NH₄H₂PO₄ 27.53 NH₄NO₃ 5.11 | 1 | 7.7 | 7.9 |
| | | 2 | 7.9 | 8.9 |
| | | 3 | 6.9 | 8.5 |
| | | | 7.5ˣ | 8.13ˣ |
| | Claimed composition containing strain | 1 | 98.4 | 99.8 |
| | | 2 | 98.7 | 100.0 |
| | Pseudomonas putida-36 and mixture of said mineral salts | 3 | 99.6 | 99.9 |
| | | | 98.9ˣ | 99.9ˣ |

It can be seen from the Table that the pure strain *Pseudomonas putida*-36 decomposes 68–76% of the initial amount of oil; a mixture of mineral salts (w/o strain), 6.4–8.13%; and the claimed composition, 98.9–99.9%.

The use of the mineral salt mixture in combination with the pure strain *Pseudomonas putida*-36 raises the efficiency of said strain 1.31–1.45 times on the average and is capable of ensuring practically 100% recovery of the media polluted with oil and oil products.

Industrial Applicability

The present invention may be used effectively on an industrial scale for recovery of oil-polluted water and soil, as well as for recovery of water and soil polluted with oil-processing products. The composition may be used in dry state and as an aqueous solution by spraying thereof onto the polluted surface of water or soil.

What is claimed is:

1. A bacterial composition for cleaning water and soil from oil pollution comprising the bacteria *Pseudomonas putida*-36 as an active biocomponent, deposited under No. B-2443, and a mineral component comprising a mixture of mineral salts, having a percent by weight of the mixture of from 34.26–37.12% $KNO_3$; 28.66–31.28% $NH_4Cl$; 26.42–28.71% $NH_4H_2PO_4$ and 11.66–2.89% $NH_4NO_3$, wherein the ratio of the biocomponent to the mineral component being from 1.26 to 1:32.

2. A composition of claim 1, wherein the content of living cells in said biocomponent is from $1.8 \times 10^{10}$ to $3.6 \times 10^{12}$ per gram of dry solid.

3. A composition of claim 1 containing an inert filler.

4. A composition of claim 3, wherein the inert filler is a solid composition selected from the group consisting of talc, paraffin, kaolin and diatomaceous earth, and is present in a ratio of filler and mixture of biocomponent and mineral component is from 30:1 to 50:1.

5. A composition of claim 3, wherein the inert filler is water.

6. A composition of claim 5 comprising from 0.07% to 0.08% by weight of the mineral salts and $10^4$ to $10^6$ living cells of the biocomponent per milliliter.

7. A method of cleaning water and soil from oil pollution, which comprises contacting the water or soil with a composition comprising a bacteria *Pseudomonas putida*-36 deposited under No. B-2443 as an active biocomponent and a mineral component comprising a mixture of salts in a percent by weight of 34.26–37.12% $KNO_3$; 28.66–31.28% $NH_4Cl$; 26.42–28.71% $NH_4H_2PO_4$ and 11.66–2.89% $NH_4NO_3$, the weight ratio of the biocomponent to the mineral component being 1:26 to 1:32.

8. A method of claim 7, wherein the number of living cells in the bicomponent is from $1.8 \times 10^{10}$ to $3.6 \times 10^{12}$ per gram of a dry biomass.

9. A method of claim 7, wherein the composition is in admixture with an inert filler.

10. A method of claim 9, wherein the inert filler is a solid selected from the group consisting of talc, paraffin, diotomaceous earth and kaolin in a weight ratio of the inert filler to the composition of from 30:1 to 50:1.

11. A method of claim 8, wherein from 350 to 800 milligrams of the composition is applied to a square meter of surface to be treated.

12. A method of claim 9, wherein the composition is in admixture with water to provide a mixture containing from 0.07 to 0.08% by weight mineral component and from $10^4$ to $10^6$ living cells per milliliter of admixture.

13. A method of claim 7, wherein the admixture is applied in an amount of 0.5 to 1 liter per square meter of a treated surface.

* * * * *